Feb. 6, 1940. J. C. OLSEN 2,189,291
BELT FASTENER
Filed Feb. 14, 1938
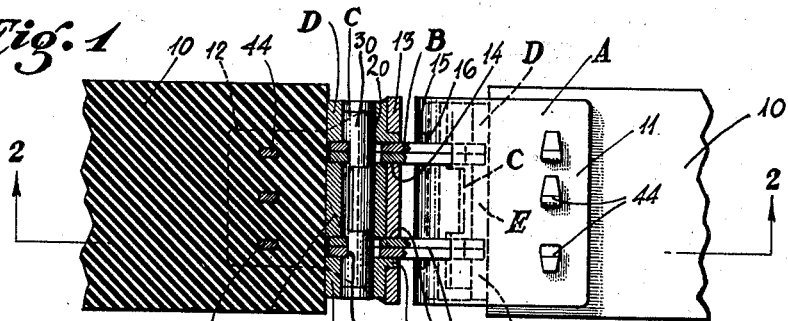
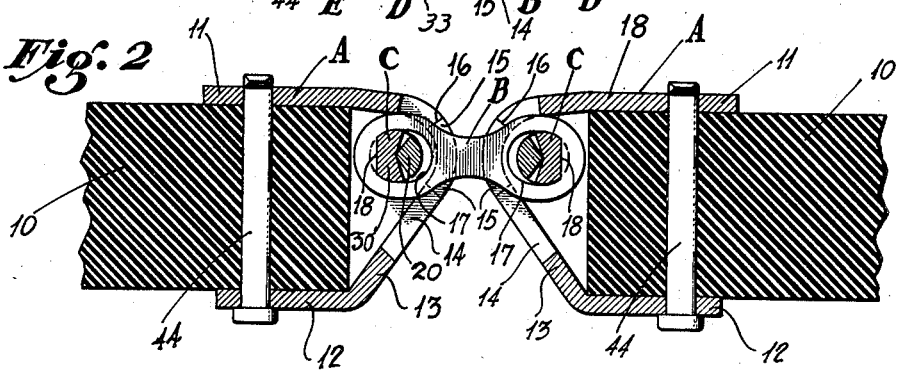
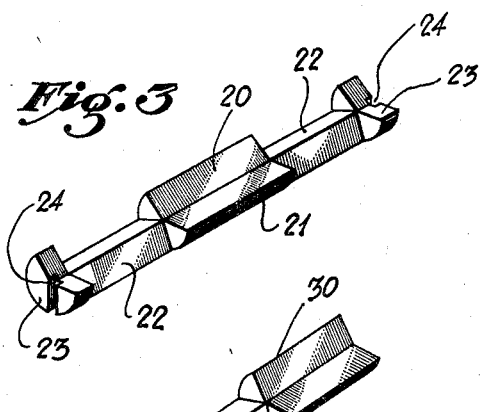
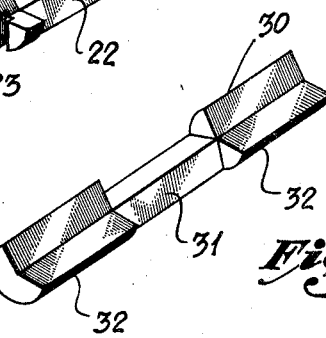
John C. Olsen
INVENTOR
BY Joseph Harris
his ATTORNEY

UNITED STATES PATENT OFFICE 2,189,291

BELT FASTENER

John C. Olsen, Chicago, Ill., assignor to Flexible Steel Lacing Company, Chicago, Ill., a corporation of Illinois Application February 14, 1938, Serial No. 190,397

4 Claims. (Cl. 308—2)

This invention relates to improvement in belt fastener and more particularly a belt fastener of the general type for V or side driving belts such as disclosed in my prior Patent No. 2,069,385, granted Feb. 2, 1937.

In fasteners of the general type shown in said patent, that is, fasteners employing links and rocker hinge pins, the hinge pins are subjected to very serious stresses and therefore relatively rapid wear, thus requiring fairly frequent replacement. Rocker hinge pins such as shown in Figures 6 and 7 of said patent for the wider classes of belts, are comparatively expensive to manufacture so that the necessity for more or less frequent replacements, combined with the fairly high cost thereof, militate against a more extensive use thereof.

The present invention, therefore, has for an object an improved V or side driving belt fastener of that type employing a link or links and rocker hinge pins and, more specifically, an improved rocker hinge pin which can be manufactured at far less cost than prior rocker hinge pins used for a similar purpose.

A specific object of this invention is to provide a rocker hinge pin of the type hereinbefore indicated, such that both sections or elements of the hinge pin may be made from the same extruded shaped wire stock to the end that the number of machine operations required to finish the parts can be reduced to a minimum.

Other objects of the invention, such as the provision of simple means to facilitate insertion and removal of the hinge pins and better bearings for the hinge pins, will more clearly appear from the description and claims hereinafter following.

In the drawing forming a part of this specification, Figure 1 is a part top plan, part horizontal sectional view of the ends of a belt showing the improvements in connection therewith. Figure 2 is a vertical, longitudinal sectional view corresponding substantially to the line 2—2 of Figure 1. And Figures 3 and 4 are detail perspectives, upon an enlarged scale, of the two complemental elements of a complete rocker hinge pin of the type shown in Figures 1 and 2.

In said drawing, 10—10 indicate the adjacent ends of a V or side driving belt to which the improved belt fastener is adapted to be applied. As shown, the improved fastener comprises two attaching members A—A; two sets of links B—B; two rocker hinge pins C—C; outer sets of bearings D—D; and center bearings E.

The attaching members A are of like form and each is preferably of bail-like formation having an outer or top wide arm 11, inner or bottom narrower arm 12 and a connecting bight 13. The arms 11 and 12 overlie the outer and inner faces of the belt as will be apparent, and each fastener is secured to its respective belt preferably by a plurality of nail or pin-like securing elements 44—44 disposed transversely of the belt, as clearly shown.

The bights of the attaching members are provided with slots or apertures 14 separated laterally of the members A and through which are adapted to be extended, the ends of the links B—B and also within which are received portions of the outer bearings D. Each of the bearings D, as shown, is of cylindrical form adapted to conform to and fit within the rounded apex of the bight 13, each said bearing D having an arcuate flange 15 seated within the aperture 14 which is preferably additionally notched as indicated at 16 to receive the arcuate flange and prevent the bearing from rotating. The center bearing E is of cylindrical formation and of such length as to snugly fit between the two sets of links B—B and by which the center and end bearings are maintained separated, as will be apparent.

The links B, each of which preferably consists of two relatively thin plate-like stampings are apertured at their ends, as indicated at 17, to receive therein the rocker hinge pins C. Said apertures 17 are somewhat elongated in the direction of length of the links and, at their outer ends are provided with flat edges 18 cooperable with corresponding notches in one of the rocker hinge pin elements, as hereinafter described.

Each of the rocker hinge pins consists of two elements 20 and 30, the details of construction of which are best illustrated in Figures 3 and 4. As shown, the element 20 is formed at its central portion with a re-entrant V section 21 and on either side thereof and contiguous thereto, with knife edge sections 22—22. As clearly shown, the knife edges proper of the sections 22 coincide with the apex of the re-entrant V angle section 21. At each extreme end, the hinge pin element 20 is preferably provided with end flanges 23—23, each of which, it will be noted, is of the same cross sectional form and size as the re-entrant V section 21. For the purpose hereinafter described, said flanges 23 are preferably provided, on their outer faces, with screw slots 24.

The other hinge pin element 30 has its central portion of knife edge cross section, as indicated at 31, and at each end thereof and contiguous thereto, is of re-entrant V-formation, as indicated at 32—32. As in the case of the hinge pin element 20, so in the case of the hinge pin element 30, the knife edge proper of the central section 31 coincides with the apices of the re-entrant V sections 32—32. The hinge pin element 30 is also provided, on that side opposite the knife edge, with transverse notches 33—33 so located as to cooperate with the links, as shown in Figures 1 and 2 to thereby provide a non-rockable engagement between each element 30 and the link. As will be understood, the outer surfaces of both hinge pin elements 20—30 are cylindrical with the axis coinciding with the knife edges proper and the radius such that the rocker hinge pins will seat properly within the bearings D and E. It will further be observed that the overall length of the element 30 is such as to loosely fit between the end flanges 23 of the element 20 so as to prevent relative endwise shift between the two elements, said flanges 23 also serving the purpose of excluding entrance of dirt or other foreign matter endwise into the rocker hinge pin.

In actual practice, the lengths of the knife edge and re-entrant sections will preferably be made substantially equal and, where there are three sections as shown, each such section will occupy approximately one third the length of the hinge pin element. As clear from inspection of Figures 3 and 4, the knife edge sections and re-entrant V sections of one element are staggered with respect to those of the other element, thus providing for a series of complemental but alternately disposed contiguous sets of cooperable rocking knife edge and re-entrant V formations throughout the length of the rocker hinge pin. As will be obvious from Figure 2, the included angle of the knife edge sections is sufficiently less than the re-entrant V angle as to allow of the desired degree of rocking action between the two elements of the hinge pin.

Special attention is directed to the fact that both elements of the hinge pin may be made from the same shape of extruded wire stock, that is, stock of the re-entrant V cross section. Because of this, the elements of the hinge pin require milling only in those portions which ultimately become the knife edge sections 22, 31, and, furthermore, both elements of a hinge pin may be milled in tandem from the same wire or rod. All these factors, use of the same stock for both elements, reduced machining operations and ability to machine both elements in tandem, greatly reduce the cost of manufacture as compared with rocker hinge pins of generally similar character heretofore employed. Furthermore, a more efficient and longer life bearing is obtained because of the equalized lengths of the alternately disposed sets of knife edges and re-entrant V formations, there being a very noticeably less tendency for the rocker hinge pin to work itself endwise within its bearings, and which factor, heretofore, has also tended to wear out the fastener more rapidly. Furthermore, the rocker hinge pins are in three bearings, as hereinbefore described, thus minimizing any tendency of the hinge pins to bend under load.

Referring to the end slots 24, the purpose of these is to facilitate rotating the hinge pins by means of a screw driver or the like, when inserting them or removing them. As will be clear from Figure 2, the links seat in the notches 33 of the hinge pins when the parts are completely assembled to thereby prevent the hinge pins from accidentally coming out. Assembling is facilitated by positioning the hinge pins so that the notches 33 thereof are turned 90° or more from their operative position, so that the hinge pins may be slipped endwise until the notches are in the planes of the links whereupon the hinge pins may be rotated until the notches engage with the links. The reverse action is employed when disassembling.

There has herein been shown and described what is now considered the preferred embodiment of the invention, but the same is merely illustrative, and all changes and modifications are contemplated that come within the scope of the claims appended hereto.

What is claimed is:

1. A fastener for the ends of a belt comprising: two attaching members, each of bail-like formation and having the bight thereof provided with a pair of laterally separated apertures; links having their ends apertured and entered through said apertures of the attaching members; a set comprised of a center and two end bearings disposed within the bight of each said member, said bearings being separated by said links; and a rocker hinge pin seated in each set of bearings and extending through the corresponding apertures of the links, each rocker hinge pin comprising two elements, each of said elements being formed with contiguous knife edge and re-entrant V formations alternated lengthwise of the element, the knife edges of one element being disposed opposite and cooperating with said re-entrant V formations of the other element to thereby provide a plurality of sets of contiguous cooperable, rocking knife edge and re-entrant V formations lengthwise of the rocker hinge pin.

2. As an article of manufacture, a rocker hinge pin for belt fasteners, said hinge pin comprising two elements, each of which is formed with like knife edge and re-entrant V formations alternated and contiguous lengthwise of the element whereby both elements may be made from the same shaped stock, the knife edge and re-entrant V formations of one element being staggered with respect to those of the other element to thereby provide a series of complemental but alternately disposed sets of contiguous cooperable, rocking knife edge and re-entrant V formations lengthwise of the rocker hinge pin, one of said elements having both of its end formations of the knife edge form and provided, at its extreme ends with flanges adapted to overlie the ends of the other element, said flanges being of the same cross sectional shape and size as the re-entrant V formation of the hinge pin element.

3. As an article of manufacture, a rocker hinge pin for belt fasteners, said hinge pin comprising two elements each of which is formed with like knife edge and re-entrant V formations alternated and contiguous lengthwise of the element whereby both elements may be made from the same shaped stock, the knife edge and re-entrant V formations of one element being staggered with respect to those of the other element to thereby provide a series of complemental but alternately disposed contiguous sets of cooperable, rocking knife edge and re-entrant V formations lengthwise of the rocker hinge pin, one of said elements being notched, for the reception of a link, on its side opposite the side of the knife and V formations thereof, one of said elements being also provided with a transverse slot at the end thereof to facilitate rotation of the rocker pin as by a screw driver for assembling with and disassembling from a link and other parts of a complete fastener.

4. As an article of manufacture, a rocker hinge pin of the type described, said hinge pin comprising two elements, each of said elements having integrally formed, contiguous, alternated knife edge and re-entrant V-formations therealong, the respective knife edge and re-entrant V-formations of the two elements being alike whereby both elements may be made from the same shaped stock, the knife edge and re-entrant V-formations of one element being longitudinally staggered with respect to those of the other element to thereby provide a series of contiguous, alternately, oppositely disposed sets of cooperable rocking knife edge and re-entrant V-formation bearings lengthwise of the rocker hinge pin.

JOHN C. OLSEN.